United States Patent Office 3,547,895
Patented Dec. 15, 1970

3,547,895
PROCESS FOR THE PRODUCTION OF HIGH MOLECULAR WEIGHT POLYAMIDES FROM N - CARBARYLOXY AMINO CARBOXYLIC ACIDS
Hugo Vernaleken and Georg Malamet, Krefeld-Bockum, Artur Botta, Krefeld-Gartenstadt, Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Filed Jan. 17, 1968, Ser. No. 698,438
Claims priority, application Germany, Jan. 19, 1967, F 51,288
Int. Cl. C08g 20/00
U.S. Cl. 260—78        3 Claims

ABSTRACT OF THE DISCLOSURE

The invention relates to a process for the production of high molecular weight polyamides by homopolycondensation of N-carbaryloxyaminocarboxylic acids at elevated temperatures, said process being carried out in the presence or in the absence of organic solvents.

---

The present invention relates to a process for the production of high molecular weight polyamides by polycondensation of N-carbaryloxy-aminocarboxylic acids.

It is known to prepare polyamides by reacting polymethylene-bis-carbamic acid alkyl or aryl esters with aliphatic dicarboxylic acids. Polyamides may also be obtained from derivatives of aliphatic α-amino acids for example by the reaction of N-carbophenoxyglycine to form the polypeptide of glycine.

It is an object of this invention to provide a process for the production of polyamides, which comprises polycondensing N-carbaryloxy-aminocarboxylic acids at temperatures between 100 and 450° C.

Hydroxyaryl compounds and carbon dioxide are split off in the process. The condensation reaction leads rapidly to formation of high molecular weight products which, depending upon the choice of starting compounds, can be worked up into moulded articles, films, foils, coatings and filaments. This process possesses the advantages over the known process that the preparation of the high molecular weight products requires only one starting component in which the reactive groups are always present in the ideal proportion to each other and that the reaction proceeds very rapidly and practically quantitatively, so that the process is especially suitable for continuous operation. A further advantage is that the starting compounds can be obtained in a particularly pure state since they can easily be crystallised from organic solvents, as compared with the purification of amino acids commonly used as starting materials which may often be difficult if these are to be polymerised to high molecular weight products by known processes.

It is also surprising that polymerisation of N-carbaryloxy-ω-aminocarboxylic acids proceeds at high reaction velocities and in high yields since the known reaction of N-carbophenoxy-glycine to give the polypeptide of glycine results in a yield of only about 17% after a reaction time of 400 hours. Owing to the high degree of conversion in the process according to the invention very small quantities of extract are obtained; this leads to an improvement in the desired properties for use of the polymers.

The process according to the invention can be carried out in solution or in the melt, thus widening the range of application. According to earlier proposals of the applicants, N-carbaryloxy-aminocarboxylic acids can be prepared by reacting an aminocarboxylic acid with a diaryl-carbonate or by reacting a trialkylsilyl ester of an amino acid with a chloroformic acid aryl ester.

For example, aminocaproic acid may be reacted with diphenyl carbonate at temperatures of about 100° C. to form N-carbophenoxy-6-aminocaproic acid. Alternatively, trimethylsilyl 2-aminobenzoate, for example, can be reacted with phenyl chloroformate in an inert organic solvent to form N-carbophenoxy-2-aminobenzoic acid.

The following compounds are specific examples of compounds which may be used in the process according to the invention:— N-carbophenoxy-3-aminobenzoic acid, N-carbophenoxy-4-aminobenzoic acid; N-carbophenoxy-3-amino-4-methyl-benzoic acid; N-carbophenoxy-3-amino-4-chloro-benzoic acid; N-carbophenoxy-4-amino-3-methoxy-benzoic acid; N-carbo-(4'-chlorophenyloxy)-3-aminobenzoic acid; N - carbo-(4'-tertiary butylphenyl)oxy-3-aminobenzoic acid; N - carbophenoxy-3-aminophenylacetic acid; N-carbophenoxy-4-amino-phenylacetic acid; N-carbophenoxy β-(3-aminophenyl) isobutyric acid; N-carbophenoxy-3-aminocinnamic acid; N-carbophenoxy-3-aminopropionic acid; N - carbophenoxy - 6-aminocaproic acid; N-carbophenoxy-11-aminoundecanoic acid; N-carboxy-(4'-chlorophenyl)oxy-6-amino-caproic acid and N-carb-(4'-tertiary butylphenyl)oxy-6-aminocaproic acid.

The polyamides prepared by the process contain the following repeating structural unit:

—[—NH—A—CO]— wherein A is an aromatic, aliphatic or araliphatic radical which may be substituted.

The process may be carried out by heating N-carbaryloxy-aminocarboxylic acid at temperatures of 100 to 250° C. in an apparatus equipped with stirrer, and completing the reaction at temperatures of 200 to 450° C., if desired under reduced pressure. In another method of carrying out the process according to the invention, poly-condensation is carried out in solution. In this case, the N-carbaryloxy aminocarboxylic acids are heated at temperatures of 150 to 350° C., if desired with application of pressure, in 5 to 100 times their quantity of an organic solvent which may contain quantities of inorganic salts, and the reaction time is adjusted so that viscous solutions are obtained which can then immediately be spun or cast to form films, or from which the polymer can be precipitated by the addition of non-solvents such as water. Solvents which may be used in this method of carrying out the process are, for example, formamide, N,N-dimethylformamide, N,N - dimethylacetamide, N-methylcaprolactam, N-methylpyrrolidone, tetramethylene urea, N-formyl morpholine, N-acetylmorpholine, pyridine or quinoline. Inorganic salts which may be added include lithium chloride, magnesium chloride, calcium, chloride and zinc chloride.

EXAMPLE 1

0.1 mol of N-carbophenoxy-3-aminobenzoic acid was heated in a condensation apparatus equipped with stirrer for 60 minutes under a pressure of 10 mm. Hg, the temperature being initially 220° C. and subsequently increased by 20° C. at intervals of 15 minutes. Carbon dioxide is given off and 0.1 mol of phenol distills off within the first 5 minutes. A pale coloured product remains behind as residue which has a relative viscosity of 1.16 measured in concentrated sulfuric acid at 25° C. with c.=1 g. in 100 ml.

Preparation of N-carbophenoxy-3-aminobenzoic acid 246 g. of a mixture of 50 mol percent 3-aminobenzoic acid and 50 mol percent N-trimethylsilyl-3-aminobenzoic acid trimethylsilylester, dissolved in 1 l. methylenechloride are reacted with 157 g. chloroformic acid phenylester, dissolved in 150 ml. methylenechloride, in the presence of 129 g. quinoline at 0° C. by adding the choloroformic phenylester solution dropwise. When the reaction is finished, the mixture is evacuated and the residue dissolved in 1 l. benzene and 35 g. methanol are added. After standing overnight the precipitated crystals are filtered off and recrystallised from toluene/alcohol. 231 g. N-carbophenoxy-3-aminobenzoic acid are obtained, M.P. 240° C. (decomposition).

EXAMPLE 2

0.1 mol of N-carb-(4'-chlorophenyl)oxy-3-aminobenzoic acid were condensed at 300° C. under a vacuum of 10 mm. Hg for 13 minutes in the same apparatus as that used in Example 1. 0.1 mol of phenol distills off spontaneously. The relative viscosity of the product obtained is 1.21 measured in concentrated sulfuric acid at 25° C. c.=1 g. in 100 ml. The N-carb-(4'-chlorophenyl)oxy-3-aminobenzoic was prepared analogous to the method for the preparation of 3-carbophenoxy aminobenzoic acid.

EXAMPLE 3

(a) 0.1 mol of N-carbophenoxy-4-aminobenzoic acid, (b) 0.1 mol of N-carbophenoxy-4-aminophenylacetic acid, (c) 0.1 mol of N-carbophenoxy-6-aminocaproic acid, and (d) 0.1 mol of N-carbophenoxy-11-aminoundecanoic acid were condensed under the conditions indicated in Table 1 in the apparatus described in Example 1. The relative viscosities and extract contents are also shown in the table.

Preparation of carbophenoxy-4-aminobenzoic acid

A mixture of 200 g. phenol, 321.3 g. diphenylcarbonate and 137.1 g. p-aminobenzoic acid are heated for 4 hours at 120° C. Thereafter 250 g. phenol are distilled off at 0.2 mm. Hg. The residue is several times extracted with chloroform. 226.5 g. N-carbophenoxy-4-aminobenzoic acid are obtained. M.P. 250° C. (decomposition).

The N-carbophenoxy-6-aminocaproic acid (M.P. 113° C.) and the N-carbophenoxy-11-aminoundecanoic acid (M.P. 88° C.) are obtained in an analogous manner.

The N-carbophenoxy 4-amino-phenyl acetic acid (M.P. 108° C.) is obtained analogous to the method given in Example 1.

TABLE 1

| Example 3 | Temp. (° C.) | Pressure (mm. Hg) | Reaction time(min). | $\eta_{rel}$ c.=1 g./100 ml. | Extract content* (percent) |
|---|---|---|---|---|---|
| (a) | 300 | 1.0 | 30 | 1.10/sulphuric acid. | |
| (b) | 300 | 2.0 | 30 | 1.19/sulphuric acid. | 2.0 |
| (c) | 275 | 0.9 | 20 | 2.33/m-cresol | 0.75 |
| (d) | 280 | 1.0 | 20 | 2.50/m-cresol | 1.0 |

*Extracted with methanol at 60° C. for 24 hours.

EXAMPLE 4

Example 4 describes the condensation of N-carbaryloxyaminocarboxylic acids in solution. In a 250 ml. glass flask equipped with reflux condenser and a connection for controlling inflow of gases, (a) 0.1 mol of N-carbophenoxy-4-aminophenylacetic acid, (b) 0.1 mol of N-carbophenoxy-3-aminobenzoic acid, (c) 0.1 mol of N-carbophenoxy-6-aminocaproic acid, and (d) 0.1 mol of N-carbophenoxy-11-aminoundecanoic acid were heated in the solvents and additives indicated in Table 2 at the temperatures indicated therein. Polymers were formed within the times indicated while 0.1 mol of carbon dioxide was split off. Formation of these polymers was indicated by the increase in solution viscosity. The polyamides could then be precipitated as colourless powders from these solutions by the addition of 100 ml. of water. The yields and relative viscosities of the products obtained are also shown in the table.

TABLE 2

| Example 4 | Solvent | Additive | Reaction temp. (° C.) | Reaction time (h.) | Yield percent of theory | $\eta_{rel}$ c.=1 g./100 ml. |
|---|---|---|---|---|---|---|
| (a) | 130 g. N,N-dimethylacetamide | 5 g. lithium chloride | 165 | 0.33 | 95 | 1.12/sulphuric acid. |
| (b) | 115 g. N,N-dimethylformamide | 11 g. zinc chloride | 155 | 2 | 95 | 1.07/sulphuric acid. |
| (c) | 130 g. N,N-dimethylacetamide | 5 g. lithium chloride | 165 | 0.5 | 95 | 2.30/m-cresol. |
| (d) | 130 g. N,N-dimethylacetamide | 5 g. lithium chloride | 165 | 0.5 | 95 | 2.1/m-cresol. |

What we claim is:
1. A process for the production of film forming polyamides which comprises poly-condensing at least one N-carbaryloxyamino carboxylic acid selected from the group consisting of N-carbophenoxy-3-aminobenzoic acid, N-carbophenoxy-4-aminobenzoic acid, N-carbophenoxy-3-amino-4-methyl-benzoic acid, N-carbophenoxy-3-amino-4 - chloro - benzoic acid, N - carbophenoxy-4-amino-4-methoxy-benzoic acid, N-carbo-(4'-chlorophenyloxy)-3-aminobenzoic acid, N-carbo-(4'-tertiary butylphenyl)oxy-3 - aminobenzoic acid, N - carbophenoxy-3-aminophenylacetic acid, N-carbophenoxy-4-aminophenylacetic acid, N - carbophenoxy-β-(3-aminophenyl) isobutyric acid, N-carbophenoxy-3-aminocinnamic acid, N-carbophenoxy-3-aminopropionic acid, N - carbophenoxy - 6-aminocaproic acid, N-carbophenoxy-11-aminoundecanoic acid, N-carboxy-(4'-chlorophenyl)oxy-6-aminocaproic acid and N-carb-(4'-tertiary butylphenyl)oxy-6-aminocaproic acid at temperatures between 100 and 450° C.

2. The process of claim 1, said polycondensing being carried out in an organic solvent.

3. The process of claim 2, said organic solvent containing inorganic salts.

References Cited
UNITED STATES PATENTS

| 2,071,253 | 2/1937 | Carothers | 260—78A |
| 2,688,011 | 8/1954 | Wheattey et al. | 260—78A |
| 2,868,770 | 1/1959 | Temin | 260—78A |
| 3,109,836 | 11/1963 | Berry | 260—78A |
| 3,232,910 | 1/1966 | Preston | 260—78A |
| 3,350,365 | 10/1967 | Wakasa et al. | 260—78A |
| 3,408,334 | 10/1968 | Caldwell et al. | 260—78A |

FOREIGN PATENTS

| 1,100,951 | 3/1961 | Germany | 260—78A |
| 857,657 | 1/1961 | Great Britain | 260—78A |
| 1,008,644 | 11/1965 | Great Britain | 260—78A |

OTHER REFERENCES

Chem. Abst., 52:16229c, Liwshitz et al., "Polymerization of N-Carbobenzoxy Amina Acid."

Chem. Abst., 53:5149f, Ishizuka, "Studies . . . Analogs: X . . . Polycondensation . . . Method."

HAROLD D. ANDERSON, Primary Examiner

E. WOODBERRY, Assistant Examiner